United States Patent
Guastaferro et al.

(10) Patent No.: US 9,621,678 B1
(45) Date of Patent: Apr. 11, 2017

(54) DELIVERING AND DISPLAYING CONTENT FEEDS ON SMARTWATCH DEVICES

(71) Applicant: LinkedIn Corporation, Mountain View, CA (US)

(72) Inventors: Douglas J. Guastaferro, Redwood City, CA (US); Amy M. Boone, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/995,000

(22) Filed: Jan. 13, 2016

(51) Int. Cl.
- G06F 15/16 (2006.01)
- H04L 29/08 (2006.01)
- H04B 1/3827 (2015.01)

(52) U.S. Cl.
CPC ........... H04L 67/327 (2013.01); H04B 1/385 (2013.01); H04L 67/02 (2013.01); H04L 67/306 (2013.01)

(58) Field of Classification Search
CPC ..... H04L 67/02; H04L 67/306; H04L 67/327; H04B 1/385
USPC .................. 709/205, 213, 217; 345/156, 173
See application file for complete search history.

(56) References Cited

U.S. PATENT DOCUMENTS

| | | | | |
|---|---|---|---|---|
| 8,764,651 B2* | 7/2014 | Tran | ..................... | A61B 5/0022 600/300 |
| 2008/0276164 A1* | 11/2008 | Bamford | ........... | G06F 17/30905 715/238 |
| 2012/0194976 A1* | 8/2012 | Golko | ..................... | G06F 1/163 361/679.01 |
| 2013/0262298 A1* | 10/2013 | Morley | ................... | H04M 1/05 705/39 |
| 2014/0230076 A1* | 8/2014 | Micucci | ............ | G06F 17/30861 726/28 |
| 2014/0243098 A1* | 8/2014 | Yong | ..................... | G06Q 50/01 463/42 |
| 2014/0304596 A1* | 10/2014 | Chandran | .............. | G06Q 50/01 715/704 |
| 2014/0310608 A1* | 10/2014 | Snyder | .................... | H04L 51/18 715/738 |
| 2014/0351832 A1* | 11/2014 | Cho | ....................... | H04L 67/141 719/328 |
| 2014/0371887 A1* | 12/2014 | Hoffman | ............ | G06K 9/00342 700/91 |
| 2014/0372551 A1* | 12/2014 | Fleck | .................... | H04W 4/001 709/213 |
| 2015/0019480 A1* | 1/2015 | Maquaire | ............ | G06F 17/3056 707/609 |

(Continued)

*Primary Examiner* — Thu Ha Nguyen
(74) *Attorney, Agent, or Firm* — Park, Vaughan, Fleming & Dowler LLP; Chia-Hsin Suen

(57) ABSTRACT

The disclosed embodiments provide a system for displaying a content feed on a smartwatch device. During operation, the system transmits a request for a content feed to a mobile application on a mobile device. When the mobile application responds with the content feed within a pre-specified period after the request, the system stores the content feed on the smartwatch device and displays the content feed on the smartwatch device. When the mobile application does not respond with an update to the content feed within the pre-specified period after a subsequent request for the content feed from the smartwatch device, the system obtains the content feed from storage on the smartwatch device and displays the content feed on the smartwatch device in lieu of the update.

20 Claims, 5 Drawing Sheets

(56) References Cited

U.S. PATENT DOCUMENTS

| | | | | |
|---|---|---|---|---|
| 2015/0019559 A1* | 1/2015 | Maquaire | G06F 17/30997 | 707/740 |
| 2015/0052221 A1* | 2/2015 | Yoon | H04W 4/008 | 709/217 |
| 2015/0149287 A1* | 5/2015 | Brown | G06Q 30/0267 | 705/14.58 |
| 2015/0193172 A1* | 7/2015 | Hokari | G06F 3/0604 | 709/213 |
| 2015/0242895 A1* | 8/2015 | Brown | G06Q 30/0257 | 705/14.55 |
| 2016/0005128 A1* | 1/2016 | White | G06Q 40/04 | 705/36 R |
| 2016/0026226 A1* | 1/2016 | Deutsch | G06F 1/26 | 713/300 |
| 2016/0036956 A1* | 2/2016 | Debates | H04M 1/72525 | 455/419 |
| 2016/0078339 A1* | 3/2016 | Li | G06N 3/084 | 706/20 |
| 2016/0080888 A1* | 3/2016 | Kreitzer | H04B 1/385 | 455/39 |
| 2016/0094665 A1* | 3/2016 | Kellmereit | H04L 67/142 | 709/203 |
| 2016/0095017 A1* | 3/2016 | Ely | H04L 61/6022 | 455/454 |
| 2016/0098414 A1* | 4/2016 | Edmonds | G06F 17/3089 | 715/234 |
| 2016/0103798 A1* | 4/2016 | Greenberg | G06F 17/248 | 715/738 |
| 2016/0135097 A1* | 5/2016 | Jinnu | H04W 36/0055 | 370/331 |
| 2016/0196244 A1* | 7/2016 | Greenberg | G06F 17/2247 | 715/205 |
| 2016/0241445 A1* | 8/2016 | Kim | H04L 41/16 | |
| 2016/0255004 A1* | 9/2016 | Ramaiah | H04L 47/12 | |
| 2016/0287166 A1* | 10/2016 | Tran | A61B 5/486 | |
| 2016/0321222 A1* | 11/2016 | Greenberg | G06F 17/2247 | |
| 2016/0342935 A1* | 11/2016 | Greenberg | G06Q 10/083 | |

* cited by examiner

DELIVERING AND DISPLAYING CONTENT FEEDS ON SMARTWATCH DEVICES

BACKGROUND

Field

The disclosed embodiments relate to digital content. More specifically, the disclosed embodiments relate to techniques for delivering and displaying content feeds on smartwatch devices.

Related Art

Content feeds such as RSS (Really Simple Syndication) feeds and Atom feeds are mechanisms for presenting content to interested people (e.g., users or subscribers) without requiring them to manually access or retrieve the content from one or more content sources. For example, a social network may generate a news feed of photos, audio, video, documents, articles, and/or other content items that are shared by members of the social network for each user accessing the social network. The user may then click on a posting of the content item within the news feed to navigate to a website on which the content item is hosted and access the entirety of the content item.

The user experience with a content feed may be significantly impacted by the selection and ordering of content items in the content feed. For example, a provider of a content feed may risk user fatigue if a subscriber is presented with low-quality content items (e.g., spam), identical content items, content items that repeatedly cover the same subject, content items that are not new, and/or content items that are not interesting or relevant to the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
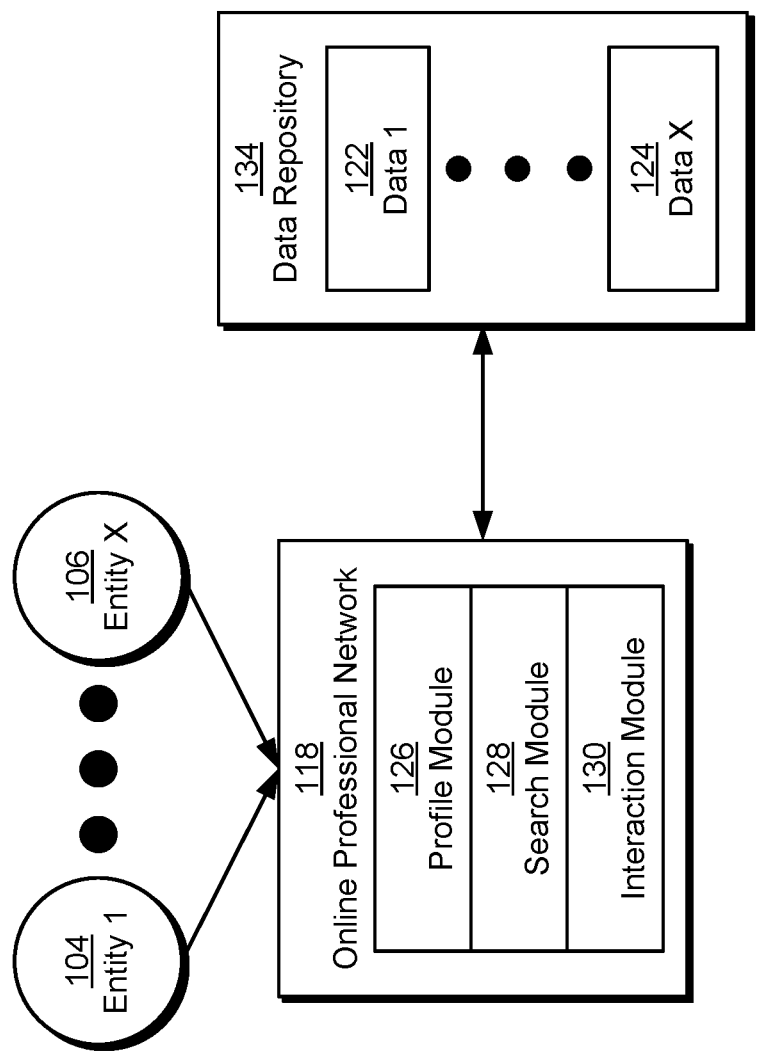
FIG. 1 shows a schematic of a system in accordance with the disclosed embodiments.

The disclosed embodiments provide a method, apparatus, and system for processing data. More specifically, the disclosed embodiments provide a method, apparatus, and system for transmitting and displaying content feeds of a social network, on a portable electronic device (e.g., a smartwatch device) with a relatively limited display area. As shown in FIG. 1, the social network data may be associated with an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in online professional network 118.

Next, the entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, exchange messages with other entities, join groups, and/or interact with (e.g., create, share, re-share, like, comment on) posts from other entities.

Those skilled in the art will appreciate that online professional network 118 may include other components and/or modules. For example, online professional network 118 may include a homepage, landing page, and/or content feed that provides the latest postings, articles, and/or updates from the entities' connections and/or groups to the entities. Similarly, online professional network 118 may include mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
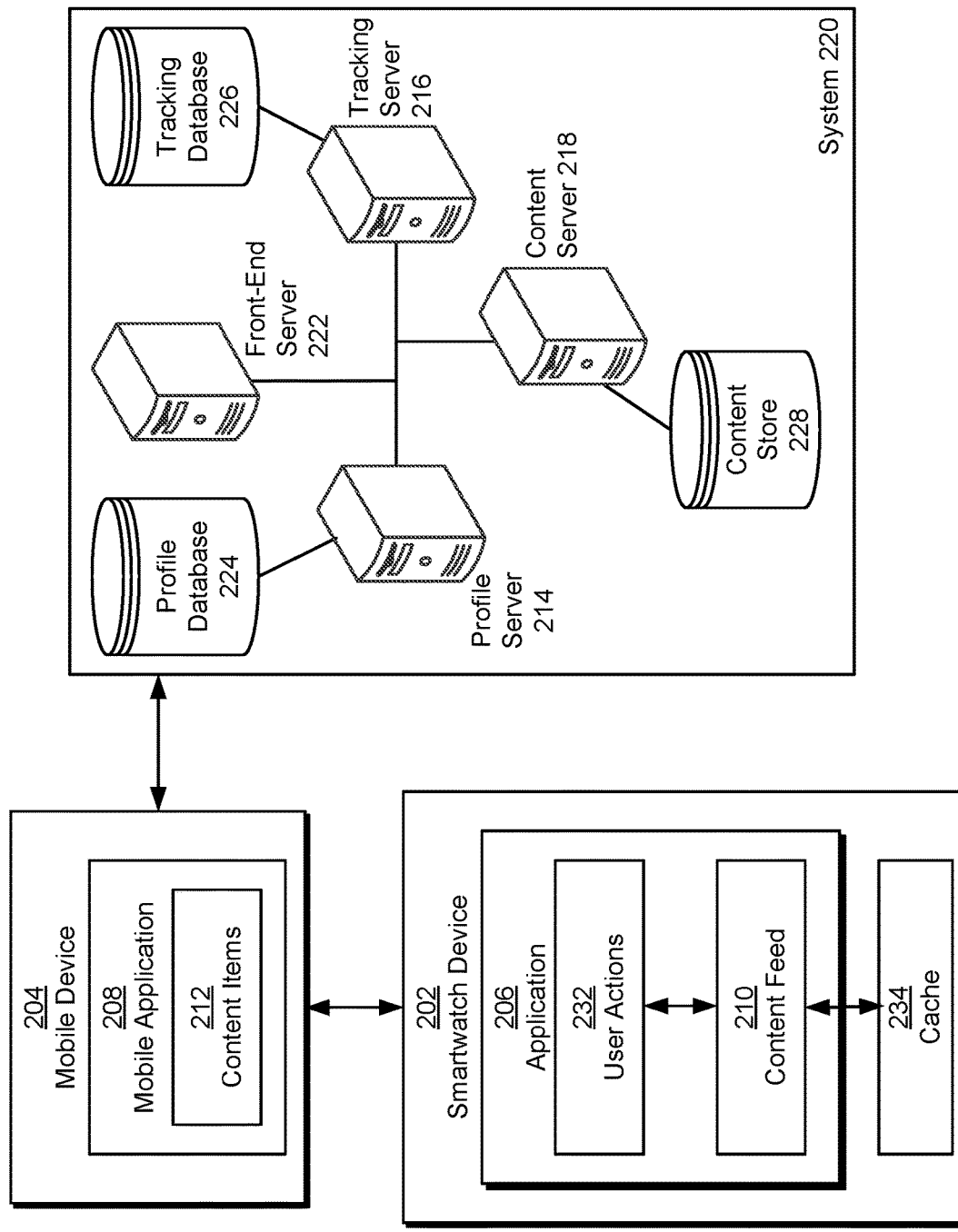
FIG. 2 shows a system for displaying a content feed on a smartwatch device in accordance with the disclosed embodiments.

In turn, the data in data repository 134 may be used to generate a content feed that is delivered to one or more devices and/or applications that interface with online professional network 118. As shown in FIG. 2, a smartwatch device 202 may communicate with a mobile device 204, which in turn interfaces with a system 220. For example, smartwatch device 202 may use WiFi, Bluetooth (Bluetooth™ is a registered trademark of Bluetooth SIG, Inc.), near field communication (NFC), and/or other types of wireless technology standards to pair and/or communicate with mobile device 204. Mobile device 204 may use a separate network connection with system 220 to communicate with system 220 and obtain data that is used by a mobile application 208 in mobile device 208 and/or an application 206 in smartwatch device 202.

System 220 may provide content and/or functionality associated with mobile application 208 and/or application 206. For example, system 220 may provide components, features, and/or services associated with an online professional network, such as online professional network 118 of FIG. 1. In turn, the functionality of the online professional network may be accessed through mobile application 208 on a mobile phone, tablet computer, portable media player, digital camera, and/or other network-enabled portable electronic device, as well as application 206 on a wrist-mounted smartwatch device 202 and/or other type of wearable computing device.

More specifically, system 220 may provide a content feed 210 of content items 212 that are displayed within application 206 and/or mobile application 208. For example, mobile application 208 and/or application may include a "news feed" of the latest activity, articles, posts, and/or updates on a social network. To improve the user experience with the social network, content items in content feed 210 may be selected and/or ordered based on the behavior and/or interests of a user of mobile application 208 and/or application 206. For example, system 220 may select and/or order the content items in a way that increases the relevance of the content items to the user.

The content items may include user profiles, job postings, user posts, status updates, advertisements, offers, announcements, articles, blog posts, images, audio, video, documents, and/or other types of content that can be accessed within or through application 206 and/or mobile application 208. For example, the content items may include articles, posts, updates, and/or media that are generated by members of a social network or online professional network and/or obtained from external websites, applications, or sources.

Within system 220, representations of the content items may be stored in a content store 228 for subsequent retrieval and use. For example, content store 228 may include an identifier, location (e.g., Uniform Resource Locator (URL)), metadata, and/or content for each content item that is created, posted, featured, and/or shared using an online professional network.

Requests for content from mobile device 204 and/or other electronic devices that interface with system 220 may be received at a front-end server 222 and matched to the user profiles of users making the requests (e.g., through the electronic devices). The requests may then be processed and/or tracked using one or more components of system 220, as described in further detail below.

Within system 220, a profile server 214 may use a profile database 224 to maintain user profiles of users of a service (e.g., social networking service, online professional network, portal site, search engine, web application, content feed service, etc.) hosted by system 220. A user's profile may include a set of attributes, such as personal (e.g., gender, age range), professional (e.g., job title, employer, industry, experience, skills, professional endorsements), social (e.g., organizations of which the user is a member, geographic area of residence), and/or educational (e.g., degree, university attended) attributes. The profile may also include a set of groups to which the user belongs, the user's contacts and/or connections, and/or other data related to the user's background, personal attributes, and/or professional attributes.

A tracking server 216 may monitor and record activity of system 220 (e.g., in a tracking database 226) and users of system 220. For example, whenever content is served from front-end server 222 (e.g., to one or more electronic devices), tracking server 216 may record the content served, the user to whom the content was served, and the time at which the content was served.

Tracking server 216 may also maintain records of user interaction with a set of content items (e.g., content items 212) obtained from system 220. For example, the records may be used to track impressions, clicks, likes, dislikes, shares, hides, comments, posts, updates, conversions, and/or other user actions 232 associated with the content items on application 206 and/or mobile application 208. The records may also track other types of activity on the social network, including connections, messages, and/or interaction with groups or events.

Content server 218 may maintain the content items in content store 228 for serving to users and responding to requests from front-end server 222. The content items may be stored in content store 228 with attributes, characteristics, and/or other information describing one or more target audiences of the content items. For example, a news article may be associated with specific attributes of users for which the news article may be relevant, such as the users' locations, industries, functions, skills, backgrounds, organizations, titles, and/or seniorities. When selecting a content item to serve in response to a request, content server 218 may match attributes or previous user activity of the user associated with the request with one or more content items. For example, content server 218 may identify one or more member segments containing a set of attributes that match those of the user's and retrieve content items that are relevant to the member segment from content store 228.

Content server 218 may also order the content items into one or more content feeds (e.g., content feed 210) based on records of user interaction with the content items from tracking database 226.

In one or more embodiments, access to content feed 210 and/or a number of content items 212 in content feed 210 is managed through interaction between application 206 and mobile application 208, as well as between mobile application 208 and system 220. Mobile application 208 may generate network requests for content feed 210 and/or other data to system 220 on behalf of application 206. For example, mobile application 208 may store security settings and/or tokens for a user account that is used to access a corresponding user profile in system 220. Mobile application 208 may use the security data to authenticate the user, establish a secure connection with system 220, and/or send and receive data with system 220. In turn, application 206 may use a separate connection between smartwatch device 202 and mobile device 204 to send and receive a subset of the data with mobile application 208 and provide features or functionality associated with the user profile on smartwatch device 202.

More specifically, application 206 may request content feed 210 from mobile application 208 and display the content feed on smartwatch device 202. Mobile application 208 may independently obtain content items 212 in content feed 210 from system 220 on a periodic and/or on-demand basis. For example, mobile application 208 may receive updates to content items 212 or content feed 210 from content server 218 during a periodic (e.g., hourly) background refresh that requests new content from system 220. Content items 212 or content feed 210 may also be updated when content feed 210 is actively viewed or used by the user through mobile application 208 (e.g., through a "news feed" feature in the mobile application).

As mentioned above, content feed 210 may include an ordered list of content items 212 from content server 218 and/or content store 228. For example, content feed 210 may include a pre-specified number (e.g., 10-20) of recent content items 212 in content store 228 that are identified by content server 218 as most relevant to the member segment of a user logged in to application 206 and/or mobile application 208.

Moreover, content feed 210 as obtained and/or displayed by application 206 may include a subset of the content in content items 212. For example, each element of an ordered list representing content feed 210 may include a title, author, photo, and/or summary of the corresponding content item. The title, author, photo, and/or summary may be displayed in one or more screens of application 206, and the user may provide one or more user actions 232 to interact with the displayed data and navigate to other portions of content feed 210. For example, the user may use scrolling, tapping, "hard tapping," swiping, multi-touch, and/or other gestures or user actions 232 to access different screens of application 206 in a linear or non-linear fashion.

Data in content feed 210 may additionally be formatted and/or processed by mobile application 208 prior to transmission to application 206. Continuing with the previous example, mobile application 208 may resize (e.g., scale down) photos in content items 212 for display on a smaller screen of smartwatch device 202. Mobile application 208 may then transmit the resized photos with JavaScript Object Notation (JSON) representations of the corresponding titles, authors, and summaries to application 206 for subsequent display on smartwatch device 202. Alternatively, mobile application 208 may transmit JSON objects or other formatted data containing the titles, authors, summaries, and Uniform Resource Locators (URLs) of the photos to application 206, and application 206 may use the URLs to request individual photos from the mobile application. After a given photo is requested, mobile application 208 may retrieve the photo from one or more components of system 220 and resize the photo before transmitting the photo to application 206.

As the user interacts with content feed 210 within application 206, the application may transmit data associated with user actions 232 to mobile application 208 for subsequent use or processing by the mobile application. For example, user actions 232 may include the selection of a "like" or "save" button for a content item in content feed 210. Application 206 may transmit an indication of the selected button with an identifier (e.g., a Uniform Resource Identifier (URI)) of the content item to mobile application 208, and mobile application 208 may provide the transmitted data to system 220. In response to the transmitted data, system 220 may provide the entirety of the content item to mobile application 208 for subsequent display of the content item within the mobile application, and/or update a user profile of the user or a record of user activity for the user with the transmitted data.

Application 206 may additionally balance the retrieval of the most recent content items from system 220 with the timely display of content feed 210 in smartwatch 202. In particular, application 206 may store the most recent content feed 210 in a cache 234 on smartwatch device 202. When application 206 is opened or accessed on smartwatch device 202, application 206 may request an update to content feed 210 from mobile application 208. If mobile application 208 does not respond with the update to content feed 210 within a pre-specified period after the request is made, application 206 may obtain content feed 210 from cache 234 and display content feed 210 in lieu of the updated content feed.

For example, application 206 may schedule a five-second timeout during which mobile application 208 can respond to a request for an update to content feed 210. If mobile application 208 cannot be reached or does not respond within the five-second period (e.g., due to issues with connectivity, mobile application 208, and/or mobile device 204), application 206 may obtain the older version of the content feed from cache 234 and display the older version in lieu of the updated version. If a response is received within the timeout period, application 206 may obtain the update from the response and display the updated content in smartwatch device 202. Application 206 may also replace an older version of content feed 210 in cache 234 with the update for subsequent retrieval in the event that mobile application 208 does not respond to a future request for content from application 206.

By interacting with one another and system 220, application 206 and mobile application 208 may deliver content feeds containing content items that are both current and relevant to the user. User actions 232 and/or other interaction with the content items may further be provided to system 220 and used to customize subsequent content feeds and/or other services provided by system 220. At the same time, application 206 may improve the user's experience with smartwatch device 202 by displaying the most recent content feed available on smartwatch device 202 in a timely manner instead of delaying the display of the content feed until the latest update to the content feed is received from mobile application 208.

Figure 3A:
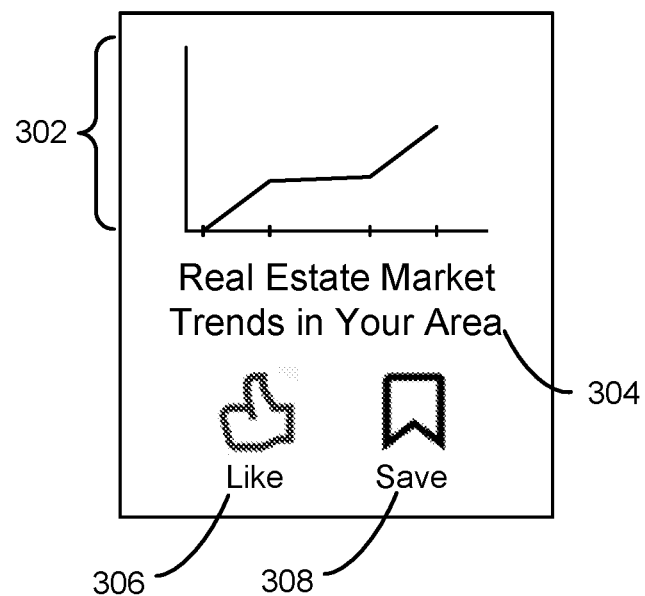
FIG. 3A shows an exemplary screenshot in accordance with the disclosed embodiments.

FIG. 3A shows an exemplary screenshot in accordance with the disclosed embodiments. More specifically, FIG. 3A shows a screenshot of a GUI provided by an application on a smartwatch device, such as application 206 of FIG. 2. As discussed above, the application may be used to provide a content feed, such as content feed 210 of FIG. 2, to a user of the smartwatch device.

Within the GUI of FIG. 3A, a number of elements 302-308 related to a content item in the content feed are displayed. Element 302 may include a photo associated with the content item, and element 304 may contain a title (e.g., "Real Estate Market Trends in Your Area") of the content item. Elements 302-304 may thus provide information that is used to identify the content item and/or the context of the content item in lieu of displaying the entirety of the content item.

Elements 306-308 may allow the user to provide input related to the content item. The user may tap and/or otherwise select element 306 to "like" the content item and element 308 to "save" the content item. When one or both elements are selected, the application may transmit an indication of the corresponding user action(s) and an identifier for the content item to a mobile application (e.g., mobile application 208 of FIG. 2) to which the application is paired. The mobile application and/or a system (e.g., system 220 of FIG. 2) may then associate the user action(s) with a user profile in a social network, online professional network, and/or other service. The mobile application and/or service may also perform other tasks based on the user action(s). For example, the mobile application and/or service may display a post, update, or indication that the user has "liked" the content item to a network (e.g., social network, online professional network, etc.) of other users connected to the user. In another example, the mobile application may retrieve the entirety of the content item in response to a "save" of the content item by the user to allow the user to view the content item in the mobile application.

The user may navigate within the application by providing additional gestures to the application. For example, the user may perform swiping, tapping, "force tapping," scrolling, clicking, double-clicking, and/or other gestures to access other screens of the application. In response to the gestures, the application may update the GUI with screens containing other portions of the content item and/or other content items in the content feed, as described in further detail below with respect to FIG. 3B.

Figure 3B:
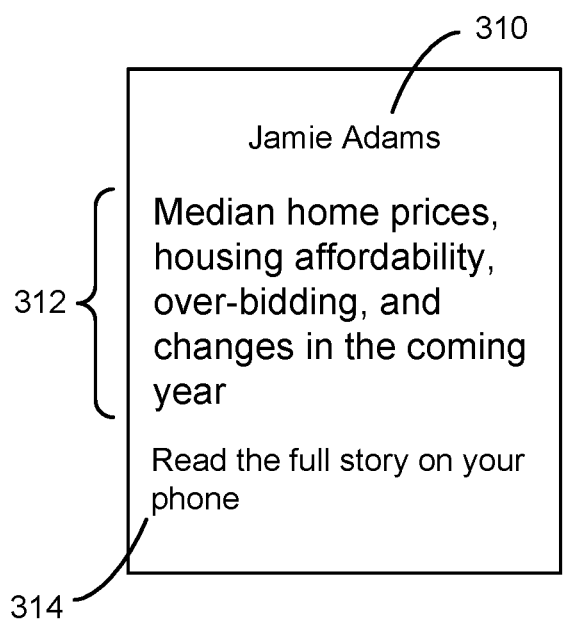
FIG. 3B shows an exemplary screenshot in accordance with the disclosed embodiments.

FIG. 3B shows an exemplary screenshot in accordance with the disclosed embodiments. More specifically, FIG. 3B shows the GUI of FIG. 3A after the user performs a gesture with the smartwatch device. For example, the application may update the GUI after the user performs a scrolling and/or swiping gesture within the GUI of FIG. 3A.

In response to the gesture, the application may display a number of additional elements 310-314 related to the content item. Element 310 may identify an author (e.g., "Jamie Adams") of the content item, and element 312 may provide a summary of the content item (e.g., "Median home prices, housing affordability, over-bidding, and changes in the coming year"). As a result, elements 310-312 may provide additional information related to the content item without showing the entirety of the content item in a space-constrained display of the smartwatch device.

Element 314 (e.g., "Read the full story on your phone") may be selected by the user to perform a user action related to the content item. For example, the user may tap on element 314 to trigger the transmission of the identifier of the content item and an indication of the corresponding user action to the mobile application. In turn, the mobile application may use the identifier to retrieve and display the entirety of the content item, thus enabling subsequent interaction with the content item on a mobile device (e.g., mobile device 204 of FIG. 2).

Those skilled in the art will appreciate that elements 302-314 may be reordered or rearranged within the GUI of FIGS. 3A-3B. For example, elements 306-308 may be displayed below each screen of the GUI, including the screen of FIG. 3B, to allow the user to perform user actions related to content items. In another example, different combinations or lists of elements identifying authors, summaries, titles, and/or photos related to content items in the content feed may be shown in one or more screens of the GUI.

Figure 4:
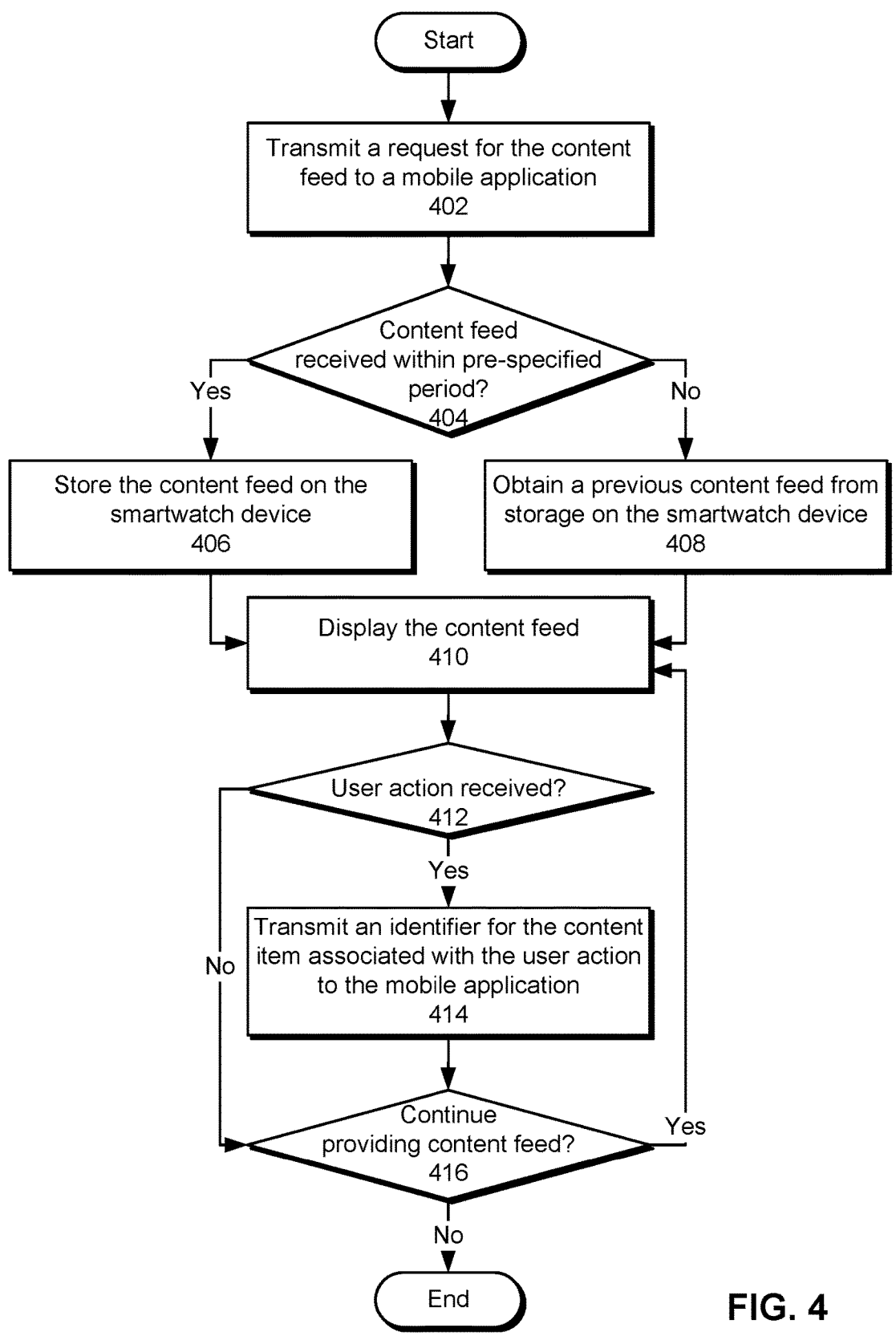
FIG. 4 shows a flowchart illustrating the process of providing a content feed on a smartwatch device in accordance with the disclosed embodiments.

FIG. 4 shows a flowchart illustrating the process of providing a content feed on a smartwatch device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a request for the content feed is transmitted to a mobile application (operation 402) on a mobile device. For example, the request may be transmitted by the smartwatch device over a Bluetooth, WiFi, NFC, and/or other wireless connection with the mobile device upon "waking" of the smartwatch device by a user. The content feed may include an ordered list of content items that is generated based on the relevance of the content items to the user. The content feed may also be updated at the mobile device during a background refresh of the mobile application and/or the most recent use of the mobile application by the user.

The request may be handled based on the receipt of the content feed within a pre-specified period (operation 404) of the request. For example, the smartwatch device may schedule a timeout of a pre-specified number of seconds during which the content feed may be received.

If the content feed is received from the mobile application within the pre-specified period, the content feed is stored on the smartwatch device (operation 406) and displayed (operation 410) by the smartwatch device. For example, the smartwatch device may store the content feed in a cache and display a title, author, photo, and/or summary of one or more content items in the content feed to the user.

If the content feed is not received from the mobile application within the pre-specified period, a previous content feed or portion of a previous content feed is obtained from storage on the smartwatch device (operation 408) and displayed (operation 410) in lieu of a more recent content feed from the mobile application. For example, the smartwatch device may retrieve, from the cache, an older content feed that was received from the mobile application in response to an earlier request for content. By displaying the older content feed after the pre-specified period has passed, the smartwatch device may provide available content to the user in a timely manner instead of delaying the display of content until the most recent version of the content is received from the mobile application.

A user action may also be received (operation 412) during display of the content feed. For example, the user action may include a "like" or a "save" of a content item in the content feed. If a user action is received, an identifier for the content item associated with the user action is transmitted to the mobile application (operation 414) for subsequent use of the content item by the mobile application. In turn, the mobile application may use the identified content item and/or user action to perform tasks such as displaying the entirety of the content item and/or associating the user action with a user profile of the user in an online professional network. If no user action is received, additional communication with the mobile application may be omitted.

The content feed may continue to be provided (operation 416) during user interaction with the content feed on the smartwatch device. If the content feed is to be provided, portions of content items in the content feed may be displayed based on gestures inputted into the smartwatch device, and information related to user actions associated with content items in the content feed may be transmitted to the mobile application (operations 410-414). The content feed may continue to be provided until user interaction with the content feed has ceased for a pre-specified period (e.g., a number of seconds).

Figure 5:
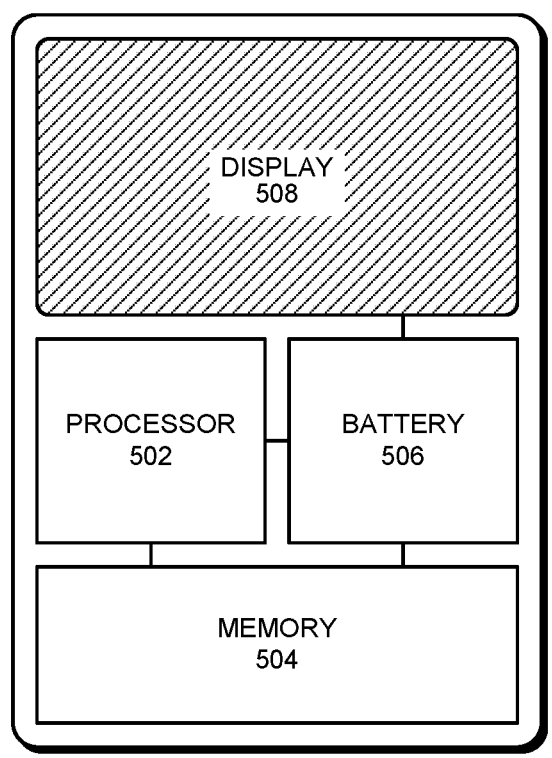
FIG. 5 shows an electronic device in accordance with the disclosed embodiments.

FIG. 5 shows an electronic device 500 in accordance with an embodiment. Electronic device 500 may correspond to an apparatus that includes a processor 502, memory 504, and/or other components found in electronic computing devices. The components of electronic device 500 may be powered by a battery 506. Processor 502 may support parallel processing and/or multi-threaded operation with other processors in electronic device 500. Electronic device 500 may also include input/output (I/O) devices such as a display 508, which can be a touch-sensitive display.

Electronic device 500 may include functionality to execute various components of the present embodiments. In particular, electronic device 500 may include an operating system (not shown) that coordinates the use of hardware and software resources on electronic device 500, as well as one or more applications that perform specialized tasks for the user. To perform tasks for the user, applications may obtain the use of hardware resources on electronic device 500 from the operating system, as well as interact with the user through a hardware and/or software framework provided by the operating system.

In one or more embodiments, electronic device 500 provides a system for displaying a content feed on a smartwatch device represented by electronic device 500. The system may include a communication apparatus and a presentation apparatus. The communication apparatus may transmit a request for the content feed to a mobile application on a mobile device. When the mobile application responds with the content feed within a pre-specified period after the request, the communication apparatus may store the content feed on the smartwatch device. When the mobile application does not respond with an updated content feed within the pre-specified period after a subsequent request for the content feed from the smartwatch device, the communication apparatus may obtain the content feed from storage on the smartwatch device. The presentation apparatus may then display the content feed on the smartwatch device.

In addition, one or more components of electronic device 500 may be remotely located and connected to the other components over a network. Portions of the present embodiments (e.g., communication apparatus, presentation apparatus, smartwatch device, mobile device, etc.) may also be located on different nodes of a distributed system that implements the embodiments. For example, the present embodiments may be implemented using a cloud computing system that manages the delivery and display of content feeds on a set of remote smartwatch devices and/or mobile devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for delivering and displaying content feeds on smartwatch devices, comprising:
   transmitting, from a first smartwatch device, a request for a first content feed to a mobile application on a mobile device;
   when the mobile application responds with the first content feed within a pre-specified period after the request:
      storing the first content feed on the first smartwatch device; and
      displaying the first content feed on the first smartwatch device;
   when the mobile application does not respond with an update to the first content feed within the pre-specified period after a subsequent request for the first content feed from the first smartwatch device:
      obtaining the first content feed from storage on the first smartwatch device; and
      displaying the first content feed on the first smartwatch device in lieu of the update to the first content feed; and
   in response to the mobile application on the mobile device receiving a request for a second content feed from a second smartwatch device, wherein the second smartwatch device is different from the first smartwatch device,
   when the mobile application responds with the second content feed, storing the second content feed on the second smartwatch device.

2. The method of claim 1, further comprising:
   obtaining, by the first smartwatch device, a user action associated with a content item in the first content feed; and
   transmitting, from the first smartwatch device, an identifier for the content item to the mobile application for subsequent use of the content item by the mobile application.

3. The method of claim 2, wherein the user action comprises at least one of:
   a like; and
   a save.

4. The method of claim 2, wherein the subsequent use of the content item by the mobile application comprises:
   displaying an entirety of the content item.

5. The method of claim 2, wherein the subsequent use of the content item by the mobile application comprises:
   associating the user action with a user profile in an online professional network.

6. The method of claim 1, wherein displaying the content feed on the first smartwatch device comprises:
   displaying a first content item in the first content feed; and
   replacing the first content item with a second content item in the first content feed upon detecting user input for scrolling through the first content feed.

7. The method of claim 1, wherein a recency of the first content feed is associated with at least one of:
   a most recent use of the mobile application; and
   a background refresh on the mobile application.

8. The method of claim 1, wherein the first content feed comprises an ordered list of content items.

9. The method of claim 8, wherein each content item in the ordered list of content items comprises:
   a title;
   an author;
   a photo; and
   a summary.

10. The method of claim 8, wherein the ordered list is generated based on a relevance of the content items to a member of an online professional network.

11. A smartwatch device, comprising:
a processor; and
memory storing instructions that, when executed by the processor, cause the smartwatch device to:
transmit a request for a first content feed to a mobile application on a mobile device;
when the mobile application responds with the first content feed within a pre-specified period after the request:
store the first content feed on the smartwatch device; and
display the first content feed on the smartwatch device;
when the mobile application does not respond with an update to the first content feed within the pre-specified period after a subsequent request for the first content feed from the smartwatch device:
obtain the first content feed from storage on the smartwatch device; and
display the first content feed on the smartwatch device in lieu of the update; and
in response to the mobile application on the mobile device receiving a request for a second content feed from a different smartwatch device,
when the mobile application responds with the second content feed, storing the second content feed on the different smartwatch device.

12. The smartwatch device of claim 11, wherein the memory further stores instructions that, when executed by the processor, cause the smartwatch device to:
obtain a user action associated with a content item in the first content feed; and
transmit an identifier for the content item to the mobile application for subsequent use of the content item by the mobile application.

13. The smartwatch device of claim 12, wherein the subsequent use of the content item by the mobile application comprises:
displaying an entirety of the content item.

14. The smartwatch device of claim 12, wherein the subsequent use of the content item by the mobile application comprises:
associating the user action with a user profile in an online professional network.

15. The smartwatch device of claim 11, wherein a recency of the first content feed is associated with at least one of:
a most recent use of the mobile application; and
a background refresh on the mobile application.

16. The smartwatch device of claim 11, wherein the first content feed comprises an ordered list of content items.

17. The smartwatch device of claim 16, wherein each content item in the ordered list of content items comprises:
a title;
an author;
a photo; and
a summary.

18. The smartwatch device of claim 16, wherein the ordered list is generated based on a relevance of the content items to member of an online professional network.

19. A system for delivering and displaying content feeds on smartwatch devices, comprising:
a communication module comprising a non-transitory computer-readable medium comprising instructions that, when executed by one or more processors, cause the system to:
transmit a request from a first smartwatch device for a first content feed to a mobile application on a mobile device;
when the mobile application responds with the first content feed within a pre-specified period after the request, store the content feed on the first smartwatch device;
when the mobile application does not respond with an update to the first content feed within the pre-specified period after a subsequent request for the first content feed from the first smartwatch device, obtain the first content feed from storage on the first smartwatch device; and
in response to the mobile application on the mobile device receiving a request for a second content feed from a second smartwatch device, wherein the second smartwatch device is different from the first smartwatch device,
when the mobile application responds with the second content feed, store the second content feed on the second smartwatch device; and
a presentation module comprising a non-transitory computer-readable medium comprising instructions that, when executed by the one or more processors, cause the system to display the first content feed on the first smartwatch device.

20. The system of claim 19, wherein the non-transitory computer-readable medium of the communication module further comprises instructions that, when executed by the one or more processors, cause the system to:
obtain a user action associated with a content item in the first content feed; and
transmit an identifier for the content item to the mobile application for subsequent use of the content item by the mobile application.

* * * * *